F. SNYDER.
Children's Carriages.

No. 139,978.            Patented June 17, 1873.

Witnesses:

Inventor:

UNITED STATES PATENT OFFICE.

FRANCIS SNYDER, OF NEW YORK, N. Y.

IMPROVEMENT IN CHILDREN'S CARRIAGES.

Specification forming part of Letters Patent No. 139,978, dated June 17, 1873; application filed May 5, 1873.

*To all whom it may concern:*

Be it known that I, FRANCIS SNYDER, of the city, county, and State of New York, have invented a new and useful Improvement in Combined Perch and Springs for a Child's Carriage; and I do hereby declare that the following is a full, clear, and exact description of the same, reference being had to the accompanying drawing forming a part of this specification, in which—

Figure 1:
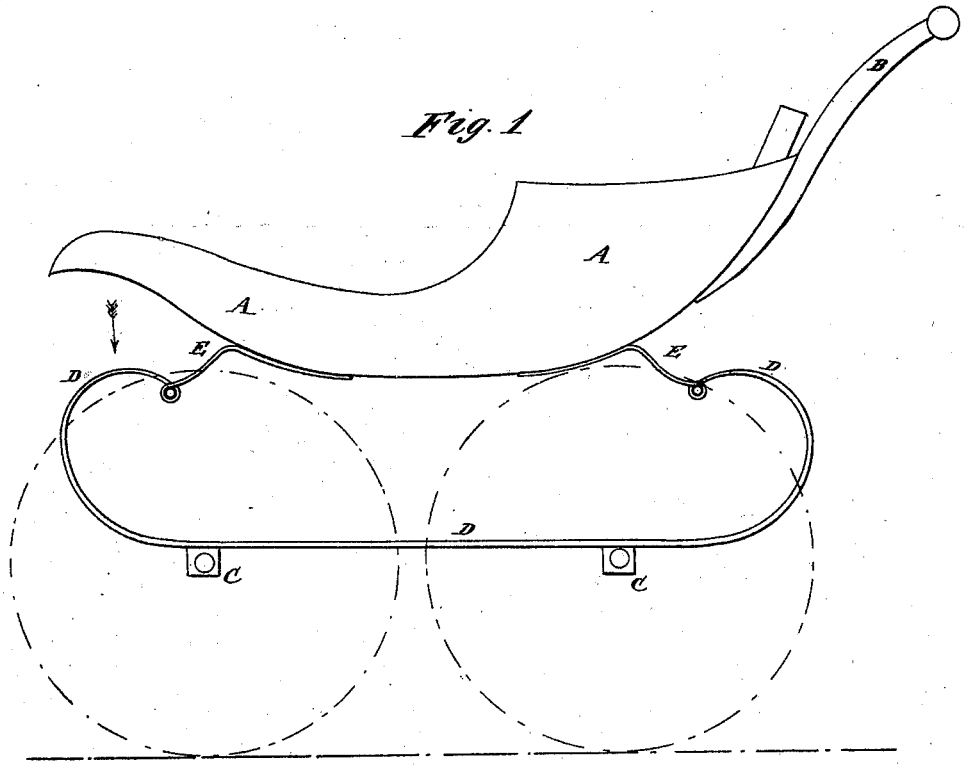
Figure 2:
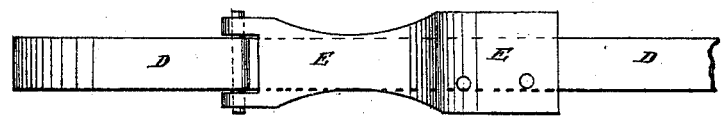

Figure 1 is a side view of a child's carriage to which my improved perch and springs are applied. Fig. 2 is a top view of the forward end of one of the springs and toe-piece.

My invention has for its object to furnish a combined perch and spring for a child's carriage, simple in construction, strong, durable, and elastic, not liable to break, and which, should the wheel strike an obstruction, will spring longitudinally, so that the body of the carriage will not be stopped with a sudden shock. The invention consists in bending the ends of the perch upward and inward into the form of the letter C, and pivoting the same to the toe-irons attached to the carriage-body, as hereinafter fully described.

A represents the body, and B the handles, of a child's carriage, about the construction of which there is nothing new. C are the axles, to which the perches D (of which there are two, one on each side) are attached. The perches at their forward and rear ends are curved upward and inward nearly in the arc of a circle, and terminate in eyes to receive bolts, by which they are pivoted to the toe-irons or shackles E, which are attached to the carriage-body A and project outward and downward, being notched at their lower ends to receive the ends of the springs D, and having eyes formed in them to receive the bolts before mentioned.

By this construction there are no sharp bends or angles in either the springs or toe-irons to make them liable to break, and should the wheels strike an obstruction the carriage-body can surge forward so that it will not be stopped with a sudden shock.

Having thus described my invention, what I claim as new, and desire to secure by Letters Patent, is—

The combined perch and springs D D D made in one piece of metal of the form shown, in combination with the toe-irons E attached to the front and rear of the body of a child's carriage, as and for the purpose set forth.

FRANCIS SNYDER.

Witnesses:
   JAMES T. GRAHAM,
   T. B. MOSHER.